United States Patent [19]
Bordes

[11] Patent Number: 5,805,379
[45] Date of Patent: Sep. 8, 1998

[54] HARD DISK RECORDING PLATTER WITH INJECTION-MOLDED LIQUID-CRYSTAL-PLASTIC HUB

[75] Inventor: Jacques Bordes, Avranches, France

[73] Assignee: Nomai S.A., Cedex, France

[21] Appl. No.: 759,384

[22] Filed: Dec. 4, 1996

Related U.S. Application Data

[62] Division of Ser. No. 274,860, Jul. 14, 1994, Pat. No. 5,615,070.

[51] Int. Cl.$^6$ .................................................. G11B 23/03
[52] U.S. Cl. ........................................ 360/99.12; 360/133
[58] Field of Search .............................. 360/99.12, 97.01, 360/133, 135

[56] References Cited

U.S. PATENT DOCUMENTS

| | | | |
|---|---|---|---|
| 4,746,013 | 5/1988 | Suzuki et al. | 360/133 X |
| 4,843,512 | 6/1989 | Moore et al. | 360/133 |
| 5,379,171 | 1/1995 | Moorehouse et al. | 360/105 |

*Primary Examiner*—John H. Wolff
*Attorney, Agent, or Firm*—Blakely, Sokoloff, Taylor & Zafman

[57] ABSTRACT

A cartridge disk that includes a door assembly mounted in a combination base and cover shell. The door assembly mounted in a combination base and cover shell. The door assembly has a single lever that opens both doors at once to allow for mounting of the cartridge disk to a drive. The cartridge disk includes a plastic hub and an aluminum disk.

2 Claims, 9 Drawing Sheets

HARD DISK RECORDING PLATTER WITH INJECTION-MOLDED LIQUID-CRYSTAL-PLASTIC HUB

This is a divisional of application Ser. No. 08/274,860 filed on Jul. 14, 1994, now U.S. Pat. No. 5,615,070.

BACKGROUND OF THE INVENTION

1. Field of the Invention

The invention relates generally to computer memory and more specifically to removable hard cartridge disks and disk drives.

2. Description of the Prior Art

Rotating magnetic storage disks used in computer memory applications generally comprise a magnetic read/write head that is flown above the surface of a rotating platter on a cushion of air. The so-called "flying-height" of such heads is so minuscule that even a hair or a microscopic particle of dirt can disturb the flight of the head and can sometimes lead to the head crashing into the platter and to permanently damaging the recording by gouging out some of the magnetic coatings. Therefore, cleanliness within a hard disk drive is of paramount importance and it is conventional to seal the rotating hard disk platters within a chamber that includes the head.

By their nature, removable hard cartridge disk storage drives must break the seal around the head and disk to remove the cartridge because the head and disk must be separated for removal. During this separation and before each separated unit can establish its own seal, contaminants can enter and cause problems the next time the cartridge is mounted in the drive. Effective sealing and air filtering mechanisms are therefore needed in order to produce a practical removable hard cartridge disk and matching drive.

Prior art cartridge disks do not allow the automatic insertion in drives in jukebox-type applications. Such a limitation prevents the automatic indexing of cartridge disks from a library.

Prior art cartridge disks further do not allow highly-automated manufacturing techniques to be used for the assembly of the disk to its hub. Such assembly conventionally requires the use of finely machined metal parts that have exceptionally close tolerances that must be maintained.

SUMMARY OF THE PRESENT INVENTION

It is therefore an object of the present invention to provide a removable hard cartridge disk system.

It is another object of the present invention to provide hard cartridge disk that can maintain an effective seal against outside contaminants and clean the air and platter within itself.

It is an object of the present invention to provide hard cartridge disk system that provides high data storage capacity.

Briefly, an embodiment of the present invention comprises a cartridge disk that includes a two-piece door assembly mounted in a combination base and cover shell. The door assembly has a single lever that opens both doors at once to allow for mounting of the cartridge disk to a drive. The cartridge disk includes a plastic hub welded to a metal platter.

An advantage of the present invention is that a cartridge disk is provided that has a long life time and extended mean-time-between-failures.

Another advantage of the present invention is that a cartridge disk is provided that allows for automatic insertion, such as in jukebox applications.

A still further advantage of the present invention is that a cartridge disk is provided that permits automated manufacturing techniques to be used for mounting the disk to the hub.

These and other objects and advantages of the present invention will no doubt become obvious to those of ordinary skill in the art after having read the following detailed description of the preferred embodiment which is illustrated in the drawing figures.

IN THE DRAWINGS

Figure 1:
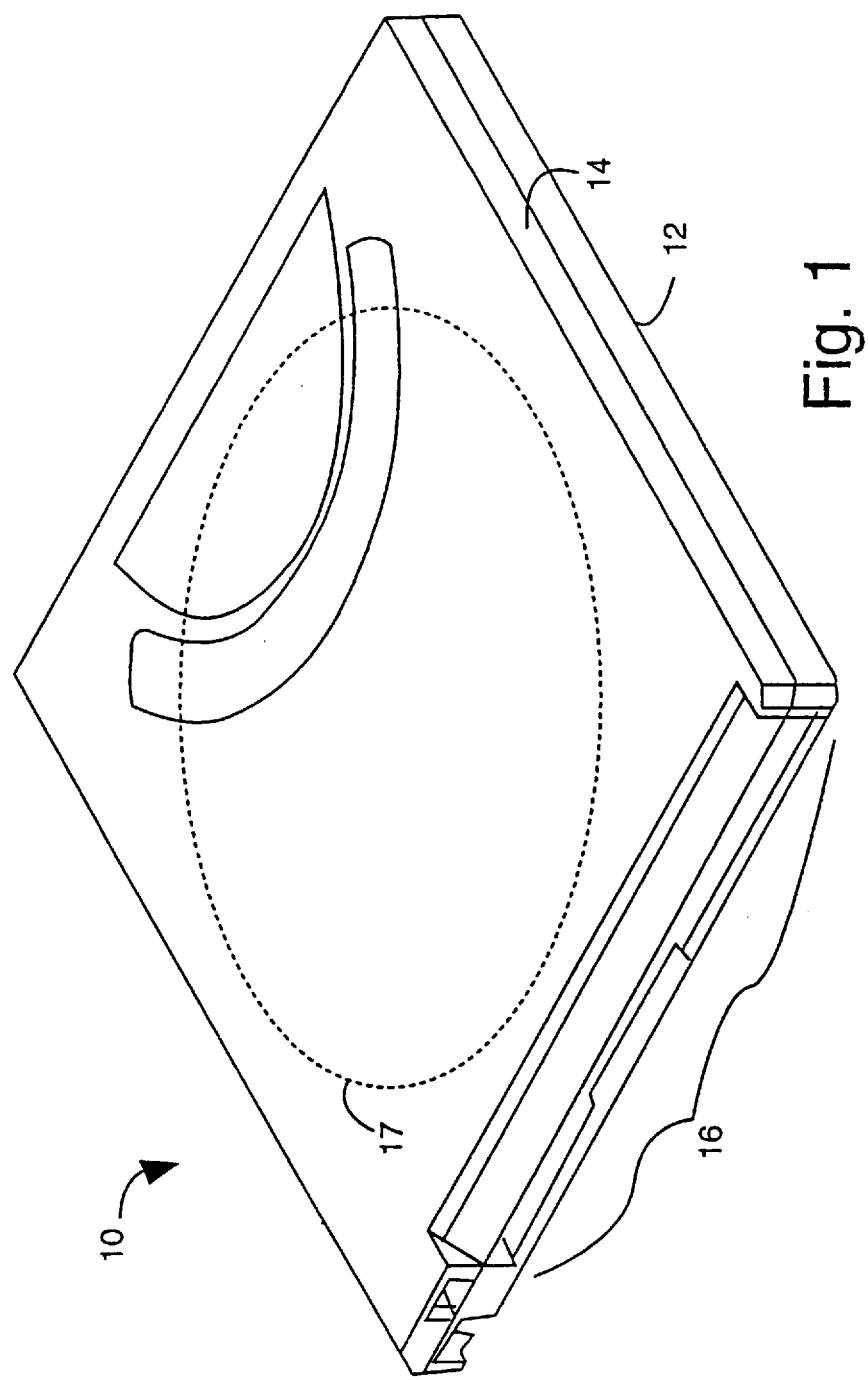
FIG. 1 is a perspective view of a removable cartridge disk embodiment of the present invention.
Figure 5:
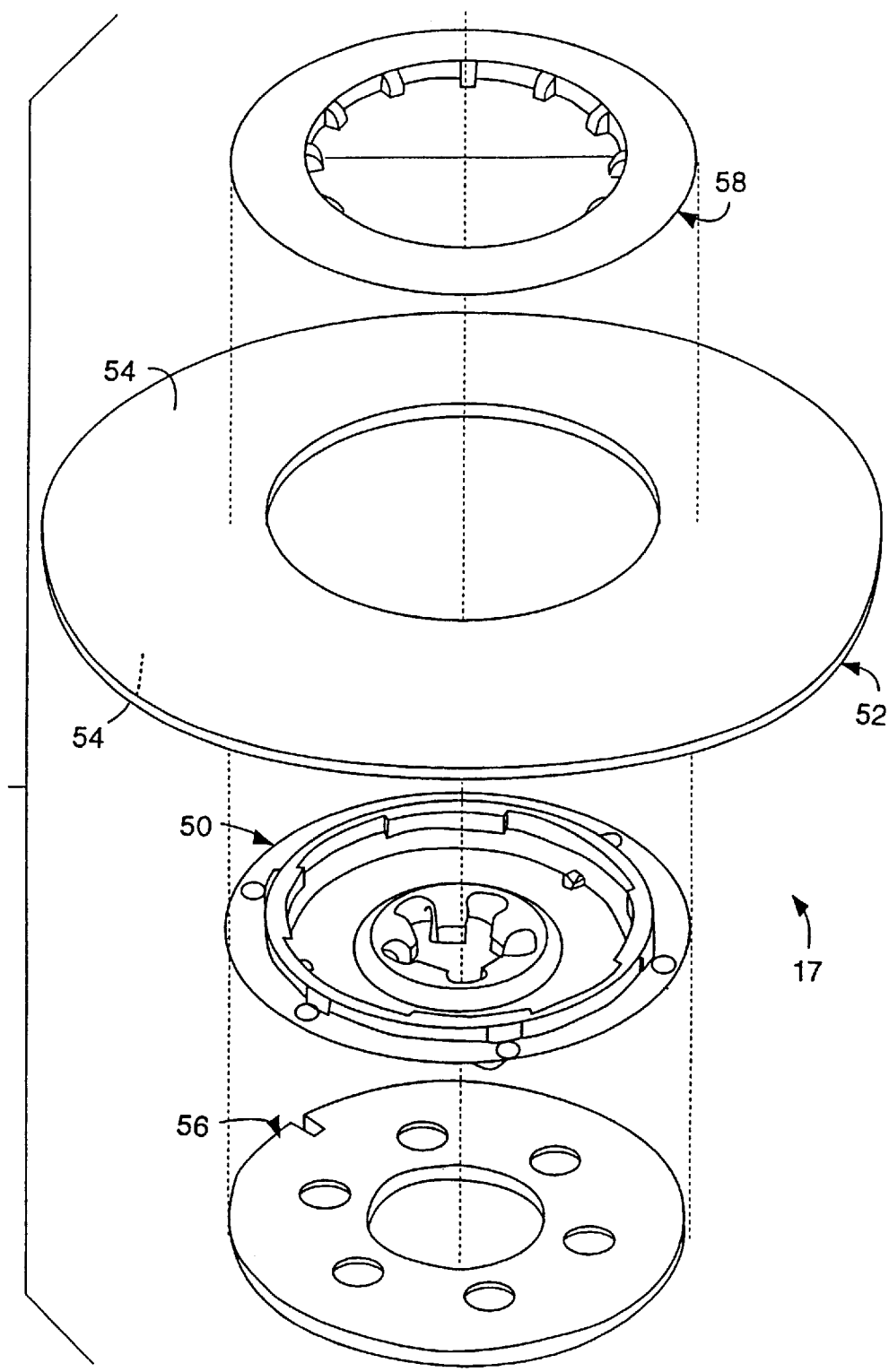

FIGS. 3A–3D respectively are top, end, cross-section and bottom views of the base included in the cartridge disk of FIG. 1;

FIGS. 4A–4D respectively are top, end, cross-section and bottom views of the cover included in the cartridge disk of FIG. 1; and FIG. 5 is an exploded assembly view of a magnetic recording platter with a hub and a metal disk for the cartridge disk of FIG. 1.

DETAILED DESCRIPTION OF THE PREFERRED EMBODIMENT

FIG. 1 illustrates a removable cartridge disk embodiment of the present invention referred to herein by the general reference numeral 10. Cartridge disk 10 comprises a base 12, a cover 14 and a door assembly 16. When removed from a disk drive, the door assembly 16 closes to seal a magnetic recording platter 17 enclosed between the base 12 and cover 14. The base 12 and the cover 14 are typically fabricated from a conductive material, in order to control electro-static discharge. The base 12 and the cover 14 form a shell enclosure to protect the platter 17 from mechanical injury and particulate contamination, as well as to protect the disk drive read/write heads from any electrostatic discharge.

Figure 2:
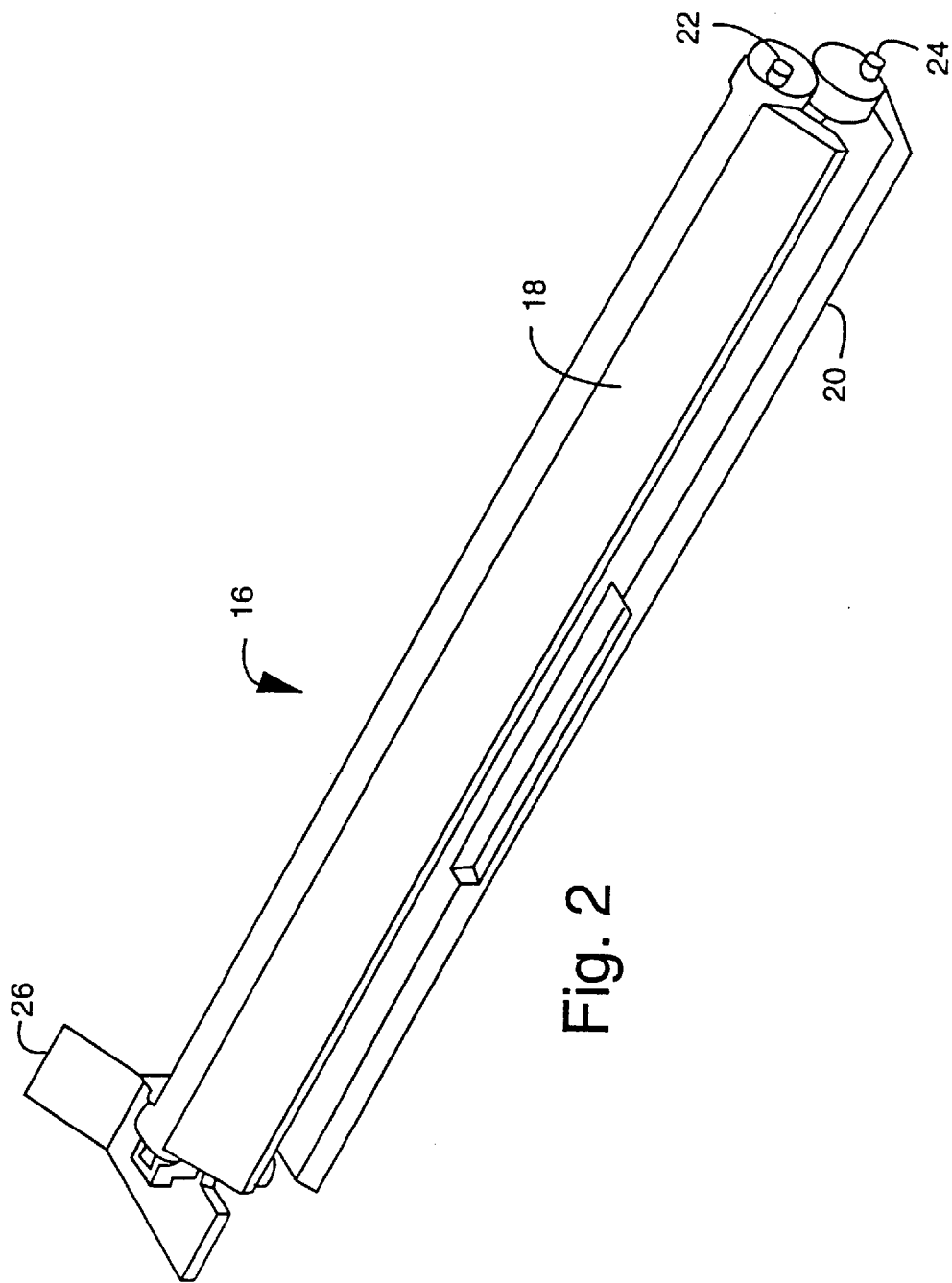
FIG. 2 is a perspective view of the door assembly included in the cartridge disk of FIG. 1.
Figure 3A:
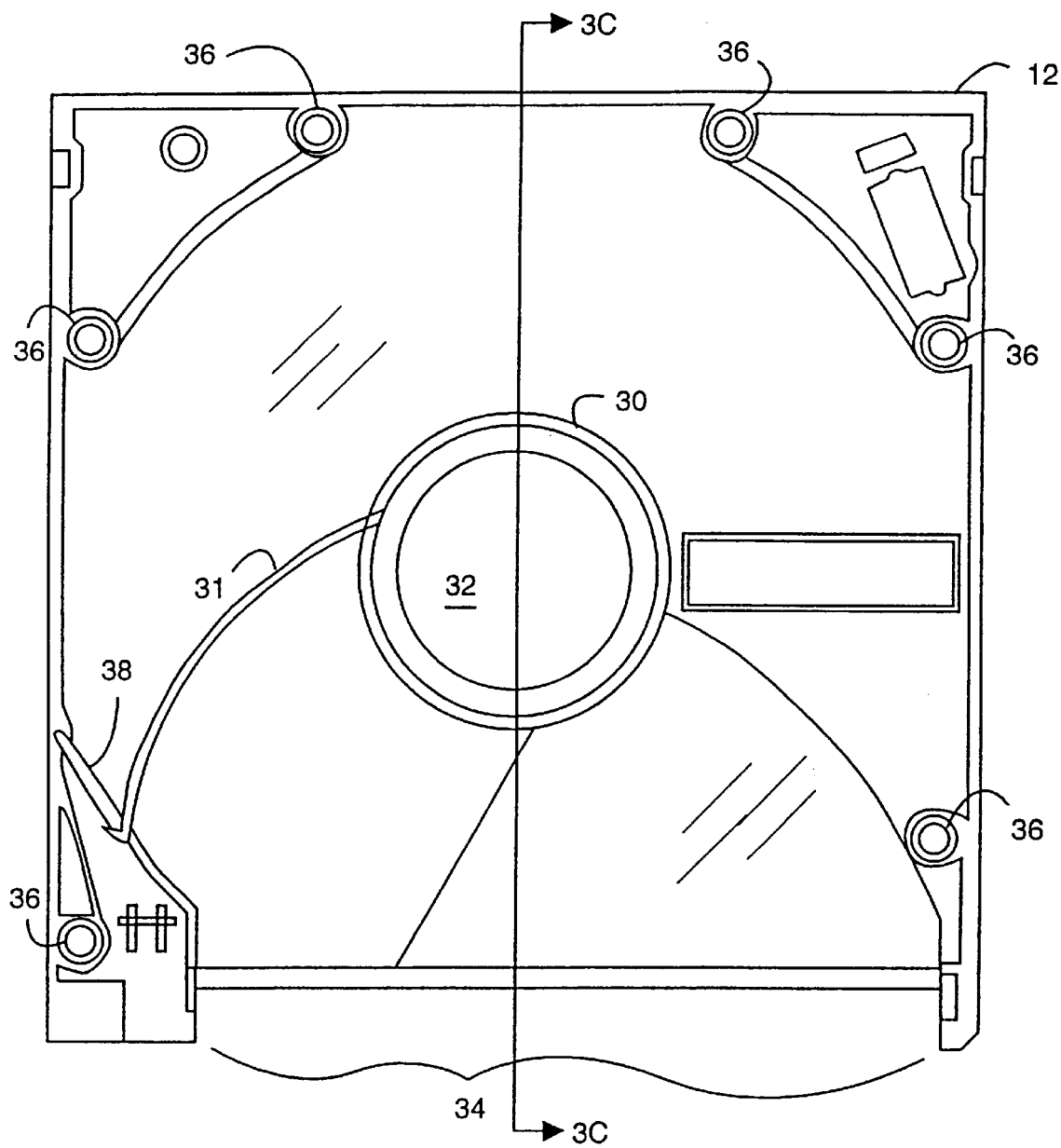
Figure 3B:
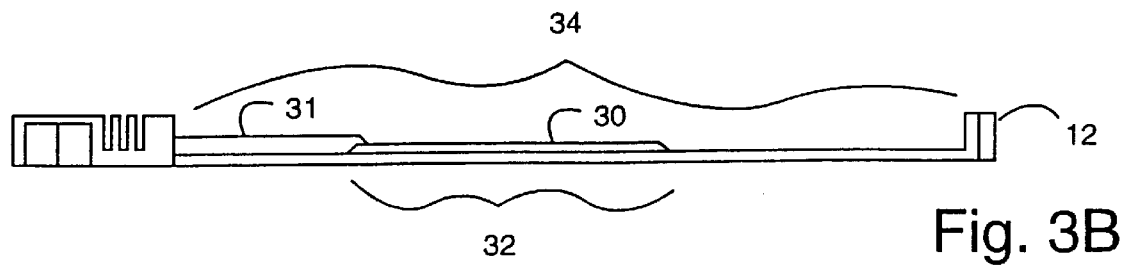
Figure 3C:
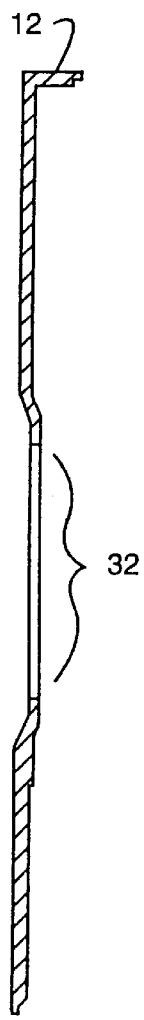
Figure 3D:
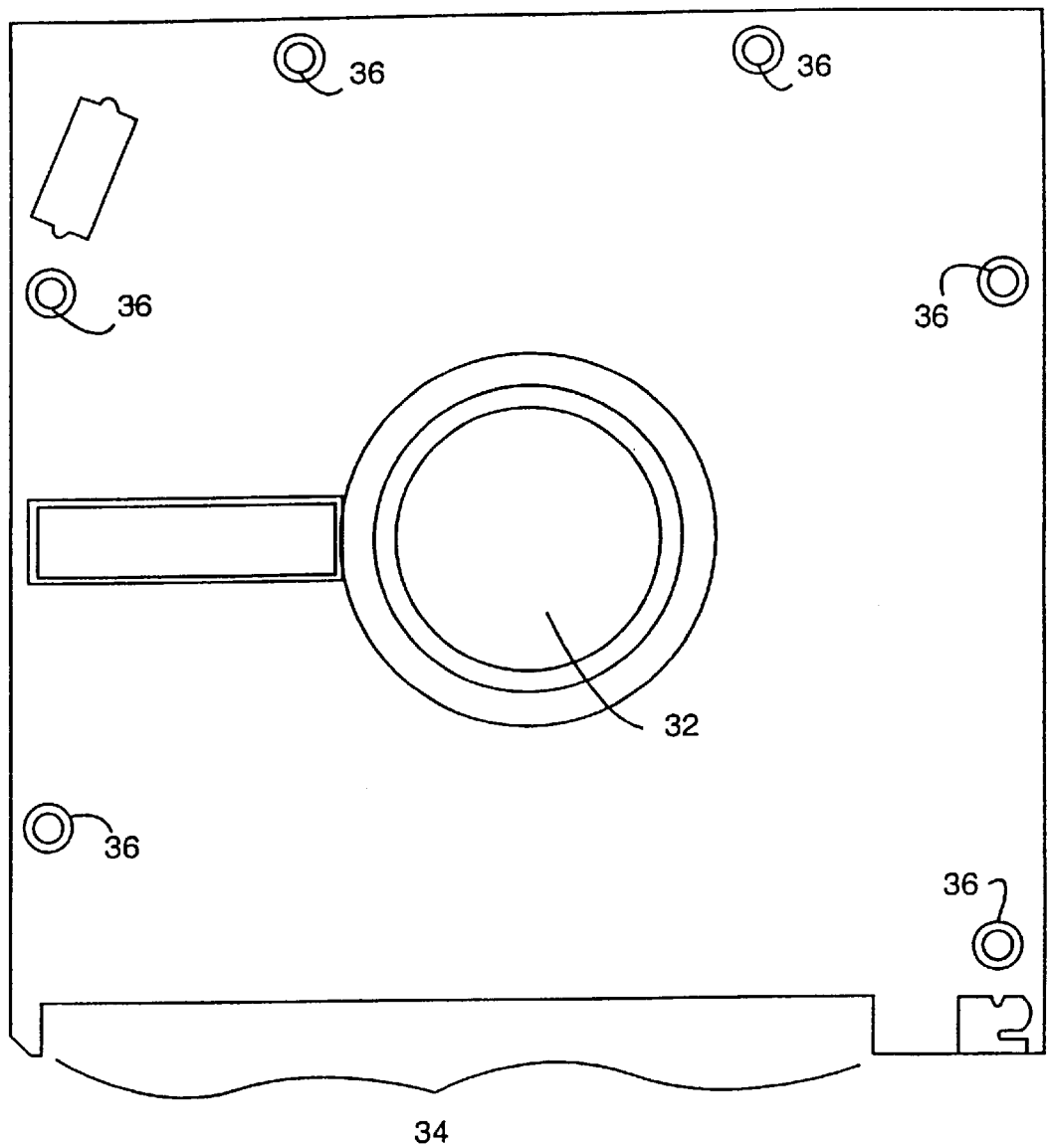
Figure 4A:
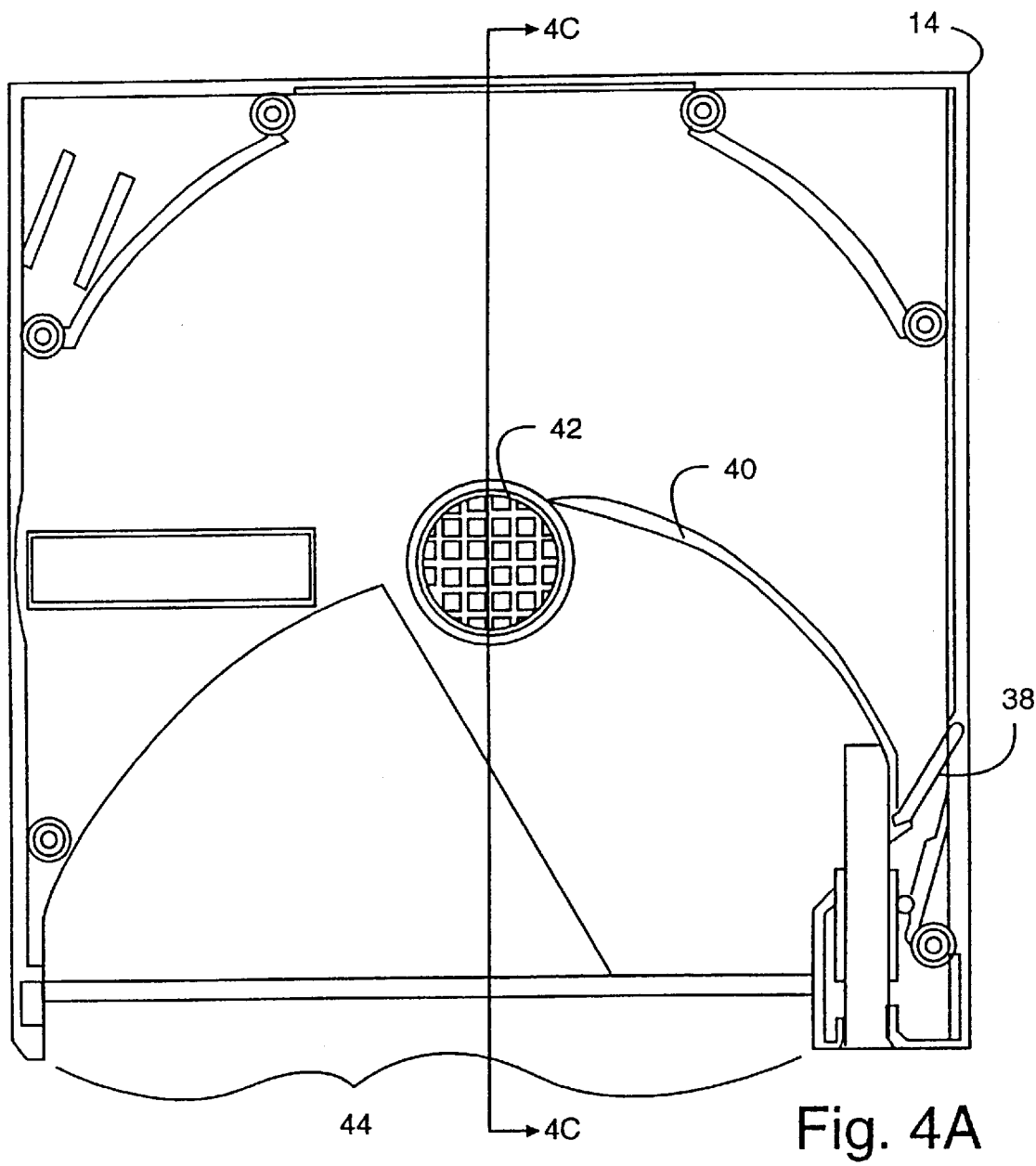
Figure 4B:
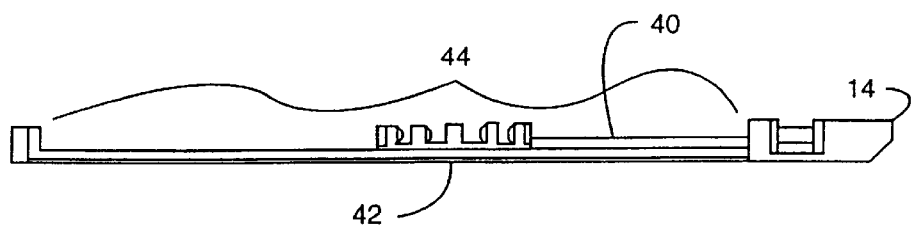
Figure 4C:
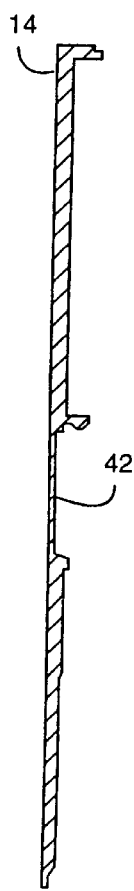
Figure 4D:
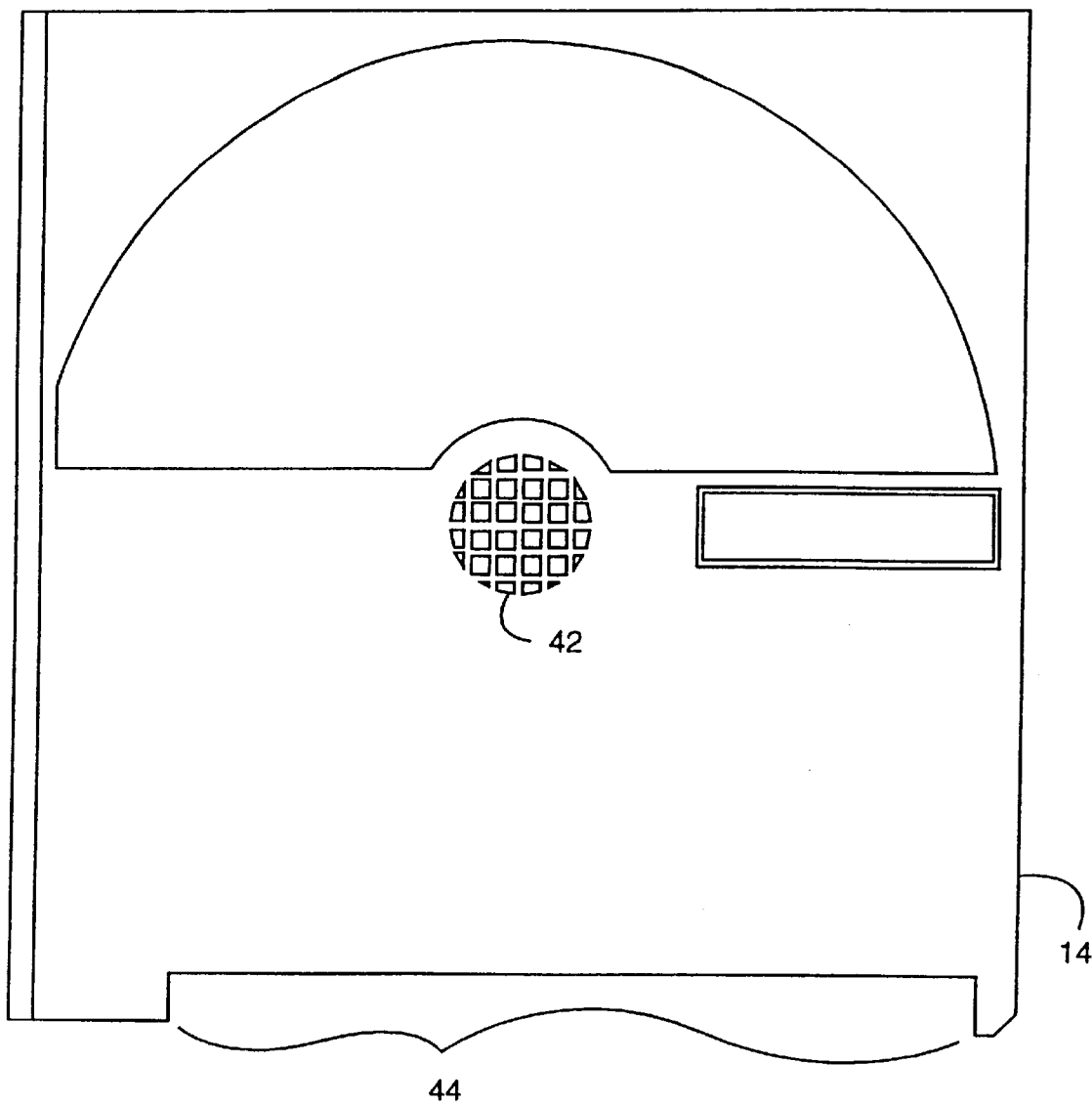

FIG. 2 shows the door assembly 16 as including an upper door 18 and a lower door 20 that can rotate on an upper pivot 22 and a lower pivot 24, respectively. The upper and lower doors 18 and 20 are configured to rotate on parallel axes and are forced to part open by a lever 26 which engages a matching disk drive pin during insertion of the cartridge disk 10 into the drive. The shape and the material used for the lever are selected for their ability to tightly shut the doors when the cartridge 10 is outside the drive and to keep the magnetic recording platter 17 protected. The doors 18 and 20 part open to accept a drive's head assembly on an actuator to engage the magnetic recording platter 17.

FIGS. 3A–3D illustrate the base 12 which includes a circular air wall 30, a radial air wall 31 radiating out from the center, a spindle opening 32 inside the circular air wall 30 and a door opening 34 at one end the base 12. Screws are typically used to attach base 12 to cover 14 through a plurality of holes 36. A filter 38 provides an exhaust for air pumped through cartridge disk 10 by action of the rotation of the platter 17 during operation. The material used for the filter 38 is preferably a commercially available electrostatic filter material, e.g., as sold in the United States by 3M Corporation (Wisconsin).

Such electrostatic filter material presents a relatively non-restrictive obstacle to air flow and thus enables the air pumping action of the spinning platter 17 to move a sufficient volume of air to be effective in decontaminating the cartridge disk 10. The air filtration preferably achieves less than 5000 particles of 0.5 micrometer per cubic foot of air around the platter 17. All the particles greater than 1 micrometer are removed inside the cartridge.

FIG. 4A–4D illustrate the cover 14 which includes a radial air wall 40 that aligns with the air wall 31 when the base 12 (FIGS. 3A–3D) and the cover 14 are joined. Air walls 40 and 31 thus position the platter 17 in between, preferably with a clearance of 0.5 millimeter on each side. An intake filter 42 is positioned at the center and also preferably comprises electrostatic filter material. A door opening 44 matches with the door opening 34, when the base 12 (FIGS. 3A–3D) and the cover 14 are joined, to accept the door assembly 16.

In FIG. 5, the magnetic recording platter 17 is shown to comprise a hub 50 of injection-molded plastic attached to an aluminum disk 52 with a magnetic coating 54 on both sides. A magnetic plate 56 is used for clamping the platter 17 to a spindle drive within a disk drive. A hub top 58 screws on to hold the assembly together. A liquid crystal plastic suitable for use in the fabrication of the plastic hub 50 is sold commercially under the trademark VECTRA, by Hoechst chemicals (Germany). With such a material, twenty-five micrometer molding accuracy is possible, thus avoiding the need to machine such parts.

Alternatively, the injection-molded plastic hub that provides for a demountable attachment to a spindle within a mating disk drive is comprised of an electrically-conductive material for grounding the disk it carries. As such, a read/write head within the disk drive is protected from an electrostatic discharge.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims are interpreted as covering all alterations and modifications as fall within the true spirit and scope of the invention.

What is claimed is:

1. A recording platter (17) for a cartridge disk, comprising:
    a disk (52) with a magnetic coating (54) for the recording of data;
    an injection-molded plastic hub (50) comprising a liquid crystal plastic material having a twenty-five micrometer molding process accuracy and attached to the disk (52); and
    a hub top (58) for attaching the disk (52) to the hub (50) and for maintaining a center and axial location of the disk to the hub.

2. The platter of claim 1, further comprising:
    a magnetic plate (56) attached to the hub (50) for magnetic clamping of the hub to a spindle included in said disk drive.

* * * * *